Patented Apr. 9, 1946

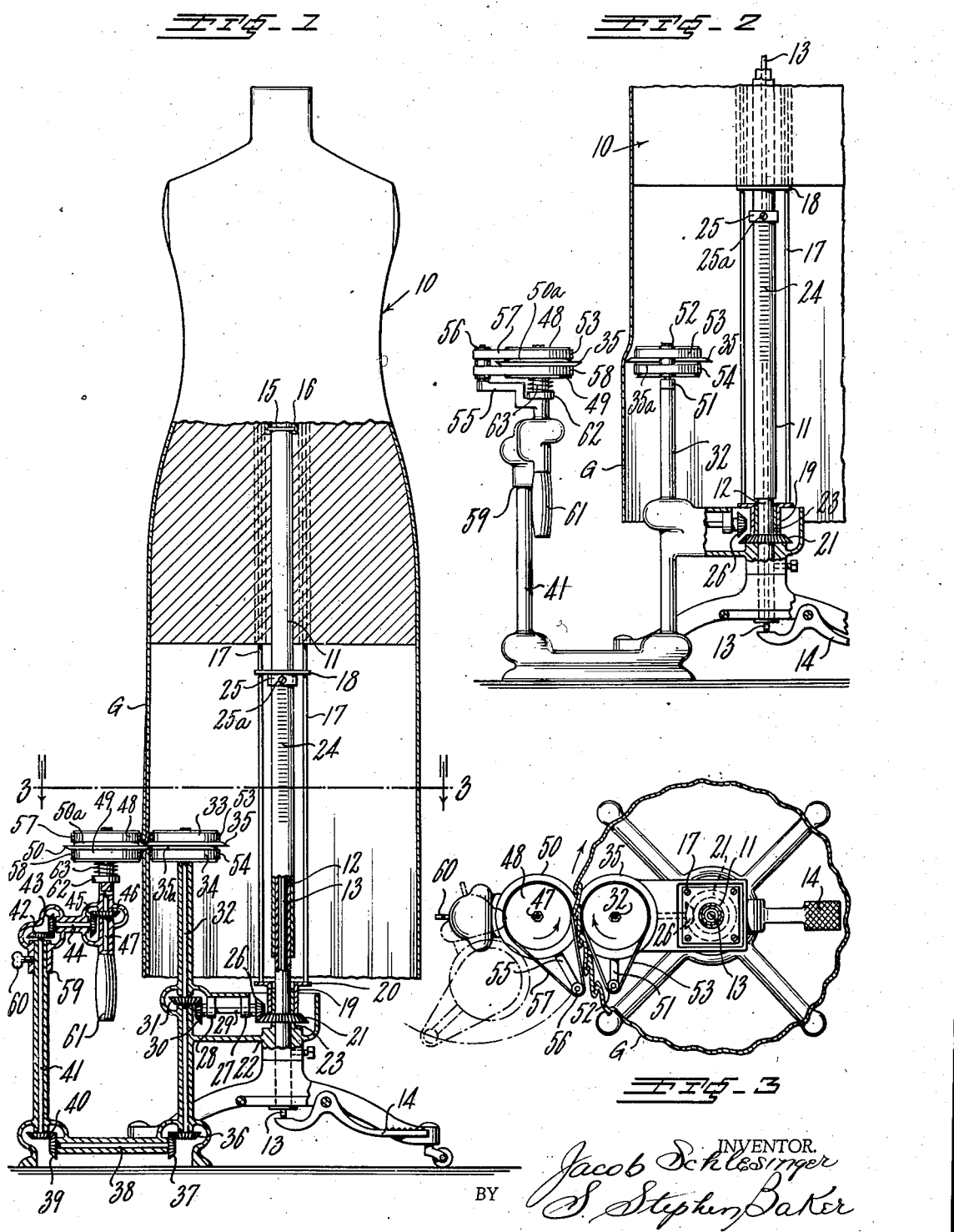

2,397,983

UNITED STATES PATENT OFFICE 2,397,983

GARMENT TRIMMING APPARATUS

Jacob Schlesinger, New York, N. Y., assignor to Man-Sew Pinking Attachment Corp., New York, N. Y., a corporation of New York Application November 17, 1941, Serial No. 419,435

22 Claims. (Cl. 164—71)

My invention relates to dress trimming apparatus used for cutting the bottom of garments to a pre-determined length while supported on a form.

The principal object of my invention is to provide a simple yet effective mechanism, operating with a minimum of parts and being economical of manufacture.

Another object of my invention is to so correlate the rotating action of the form and the cutting mechanism as to drive them from a common source of motive power whereby the rotation of the dress form causes the cutting mechanism to operate or vice versa.

Another object of my invention is to provide such an apparatus which can be connected to forms which are standard in the industry.

Other objects of my invention will be apparent from the following description, it being understood that the above general statements of the objects of my invention are intended to describe and not to limit it in any manner.

In the drawing:

Fig. 1 is a front, elevational view, partly broken away and in section, of a dress form with the mechanism supplied thereto, in the operative position.

Fig. 2 is a similar though fragmentary view thereof, the mechanism being shown in the inoperative position.

Fig. 3 is a section along the line 3—3 of Fig. 1.

The form 10, including the telescoping tube 11, telescoped post or standard 12, rod 13 and treadle 14, represents a garment form of known and used construction, United States Patent No. 1,022,608 of April 9, 1912 being representative thereof. Said patent discloses an expanding clutch operated by the rod, the clutch being released when the treadle is depressed so that the telescoping tube is capable of longitudinal motion in respect to the telescoped post whereby the form per se may be manually raised or lowered and then maintained in the desired position when the treadle is released.

The tube 11 has an enlarged end 15 loosely retained within the chamber 16 of the form 10 so that while the form 10 and tube 11 are capable of no relative longitudinal movement, the form 10 may be rotated about the tube 11.

The driving mechanism which is connected to the form 10 so as to operate the cutting mechanism when the form is rotated comprises the parallel rods 17 loosely housed in channels formed in the form 10. Secured as by solder to the four rods 17 is the plate 18 which loosely surrounds the tube 11. The collar 19 is similarly secured to the rods 17 by the flange 20 and the relatively large bevel gear 21 is connected to the collar 19.

Extension 22 of the main casting connects the driving mechanism above described to the cutting mechanism. This extension 22 has an opening formed therein and a bushing 23 to snugly embrace the tube 12. The collar 19 rotates around this bushing 23.

The tube 11 is provided with indicia 24 for setting the form at the desired height and a collar 25, secured to the tube 11 by a set screw 25a is longitudinally adjustable on the tube 11 so that any height may be pre-determined and set and the garment G cut at the desired length.

The mechanism above described operates in the following manner:

Assuming the mechanism is in the inoperative position shown in Fig. 2, the collar 25 is loosened and then set as desired at a particular place on the tube 11 according to the indicia 24. The treadle 14 is then depressed thus releasing the tube 11 and permitting the manual raising or lowering of the form 10 and garment G. In the present instance, the form 10 is raised but the rods 17, plate 18, collar 19 and gear 21 are stationary since the rods 17 are loosely retained in the channels of the form 10. However, when the collar 25 meets the plate 18, it starts to lift the aforesaid plate 18, rods 17, flange 20, collar 19 and gear 21 until the gear 21 meets the gear 26, whereupon further upward movement of the form 10 is prevented. Thus the form and driving mechanism assume the position shown in Fig. 1, wherein the space between plate 18 and the bottom edge of the form 10 is equal to the distance between the plate 18 and collar 25 when in the inoperative position, (Fig. 2) plus the small distance between the gears 26 and 21 when they are out of engagement.

When the gears 26 and 21 mesh thus preventing further upward movement of the form 10, the treadle 14 is released and the form will remain clutched in the raised, predetermined position ready for the cutting operation.

The cutting mechanism is driven through the chain of gears initially operated by the gear 21.

The gear 26 is connected to shaft 29 which is journalled in bearings 27 and 28 depending from the main housing. To the other end of shaft 29 is connected the gear 30 which meshes with the gear 31. The gear 31 thus rotates the shaft 32, the upper end of which drives the pulley and cutting unit comprising of the pulleys 33 and 34 and the cutting disk 35. A spacer disk 35a serves to maintain the opposed pulleys in alignment as will be hereinafter described. This unit may be connected to the shaft 32 in any suitable manner as by keying.

The lower end of shaft 32 bears the gear 36 which meshes with the gear 37 driving the shaft 38 and the gear 39. Gear 40 is thereby rotated, further actuating the shaft 41, gear 42, gear 43, shaft 44, gear 45, gear 46, and shaft 47 which in turn drives the pulleys 48 and 49 and the cutting disk 50. It will be noted that the gear arrangement is such that the pulleys and cutting disks rotate in a direction corresponding to the direction of rotation of the form 10 as illustrated in Fig. 3. A spacer disk 50a compensates for the thickness of the cutting disk 35 and brings the pulleys 48 and 33 into alignment just as the pulleys 49 and 34 are brought into alignment by the spacer disk 35a.

Most garments have a certain fullness produced through shirring or through pleats or folds in the skirt portion thereof. This fact presents a problem in performing the cutting operation and one expedient adopted has been the tacking of the skirt portion around a large disk so that the cutting blade can proceed uniformly around the garment. I consider this method rather clumsy and slow because of the preparation required before commencing the cutting operation. Accordingly, I provide automatic means designed to receive the material of the garment before it reaches the cutting zone and designed to compress the folds immediately prior to their reaching the cutting disks.

Formed integral with the main housing is the arm 51 which supports a pulley 52. Belts 53 and 54 run over the pulleys 33 and 34 and the pulley 52. Similarly integral with the housing is the arm 55 supporting the pulley 56. Belts 57 and 58 run over the pulleys 48 and 49 and the pulley 56. The arms 51 and 55 are laterally inclined toward each other so as to bring the sets of belts closer together.

The action of the belts is illustrated in Fig. 3 wherein the folds of the material are compressed by the belts above and below the cutting disks which thereupon cut the folded material regardless of the original fullness thereof.

Means are provided to swing one of the cutting units away from the other so as to permit the insertion of the garment material therebetween. Accordingly, the outer cutting unit is swingably supported on the main housing at 59 and a set-screw 60 is provided for locking the unit in the operative cutting position shown in Fig. 1. A handle 61 serves to facilitate the swinging movement, the gear 43 riding around the gear 42 when the unit is so swung.

In order to insure a proper cutting engagement between the cutting disks, a boss 62 may be formed on the housing and a helical compression spring 63 provided to urge the outer cutting unit slightly upwardly into engagement with the inner unit. This spring, however, may be dispensed with if the engagement is ordinarily sufficient.

In actual operation, the collar 25 is set according to the desired height, the treadle 14 is depressed and the form 10 is manually raised until further upward movement is resisted. The treadle is then released and the form will be at the desired height while the gears 21 and 26 will be engaged.

The set-screw 60 is loosened and the outer cutting unit is swung away as illustrated in Fig. 3. whereupon the material of the garment is inserted between the cutting units. The outer cutting unit is swung back, and the set-screw 60 tightened, the outer cutting unit being very slightly manually depressed against the action of the spring 63 if this is necessary to insure against the cutting disk 50 lying above the cutting disk 35.

The form 10 may now be rotated either manually, or by a suitable crank and gearing device, not shown, or by a motor connection, not shown. The motive power may assume any form, the manual rotation being simple and effective. By the term, manual, is meant the grasping of the form 10 by the hands and the rotation of the same thereby so that this force is impressed on the transmission described to drive the cutting mechanism. The pulleys and cutting disks will rotate at the same peripheral speed as the form 10 but will, of course, make many more revolutions depending on the relative diameters of the cutting disks and the form 10.

As the form rotates, the bottom of the dress will be sheared off. It may be desirable to provide a pressure roller for bearing against the outer cutting unit to support the cut fabric and a member such as shown in my co-pending application, Serial No. 367,727, filed Nov. 29, 1940, may be employed.

It will be seen that I have provided a device wherein the form is rotated and which in turn operates the cutting disks so that the action is correlated throughout. This correlation is most important in that the entire mechanism is responsive to the slightest motion of the operator who may rotate the form 10 slowly or quickly or may pay particular attention to some portion of the garment being cut while being obliged to perform only one act, that of rotating the form. Thus not only is the mechanism itself extremely simple but its practical operation is likewise simplified while its performance is at least as satisfactory as the results achieved by much more complicated machines.

I have shown a preferred embodiment of my invention but it is obvious that numerous changes and omissions may be made without departing from its spirit as expressed in the claims. For example, while I have illustrated the use of shearing cutters, it is also possible to use one cutting disk operated by the transmission disclosed herein and either a pressure roller urging the material against the cutting disk, or a cylinder acting as an abutment for the rotating cutting disk. In either of these expedients, the cutting disk may assume the form of a pinking device whereby the bottom edge of the garment is not only cut but pinked also.

The motive power may likewise originate at the cutting end of the transmission so as to rotate the form. As long as the cutting mechanism and form are driven from the same source of power and correlated the advantages of the invention are realized.

I claim:

1. A garment trimming apparatus comprising a rotatable support for a garment, a cutting unit, rotatable cutting means on said cutting unit and transmission means for transmitting motion from said rotatable support to said rotatable cutting means.

2. A garment trimming apparatus comprising a rotatable support for a garment, a cutting unit connected to said support, oppositely disposed cutting members on said cutting unit, located respectively at opposite sides of the material of the garment to be cut, and connecting means between said members and the support whereby rotation of said support is transmitted to said cutting members.

3. A garment trimming apparatus comprising in combination a rotatable support for a garment, a pair of driven coacting cutting members connected to and laterally of said support and between which the material of a garment on said support passes, pulleys on said cutting members and belts driven by said pulleys, said belts being disposed substantially anteriorly of said cutting members for compressing the folds of the material of the garment so as to present said material in a flattened state to said cutting member.

4. A garment trimming apparatus according to claim 3 wherein there are two sets of pulleys and belts, each set comprising two belts respectively disposed above and below each cutting member.

5. A garment trimming apparatus comprising in combination a rotatable support for a garment, rotatable cutting means, movable means disposed anteriorly of said cutting means for compressing the folds of the material of said garment before reaching said cutting means, and transmission means connected from said rotatable support to said cutting means and movable means whereby said support, cutting means and movable means move in unison and according to the actuation of said support.

6. A garment trimming apparatus according to claim 5 wherein said cutting means comprises a pair of co-acting cutting disks, and said movable means comprises pulleys operatively connected to said cutting disks and two pairs of belts respectively disposed above and below said cutting disks and driven by said pulleys, said pairs of belts being juxtaposed so as to compress the folds of said material before reaching the cutting disks.

7. A garment trimming apparatus comprising in combination a rotatable support for a garment, a rotating cutting member and means disposed anteriorly of said cutting member for compressing the folds of the material of said garment so as to present said material in a flattened state to said cutting member, said means comprising a pair of movable belts between which said material passes, said belts being juxtaposed and being arranged to travel in the same direction as said support.

8. In combination with an axially movable, rotatably mounted garment support, garment trimming apparatus and drive means therefor comprising a cutting unit, a first gear, a second gear and transmission means between the latter gear and the cutting unit, said gears being operatively disconnected in one position of said garment support, and means connected with the support to establish an operative connection between said gears in the axial movement of the support to another selected position.

9. In combination with an axially movable, rotatably mounted garment support, garment trimming apparatus and drive means therefor comprising a cutting unit, a first bodily shiftable gear operatively disconnected from a second gear having driving connection with said cutting unit, in one position of the support, means connecting said first gear with the support for unitary rotation therewith, and means co-acting with said last named means when the support is axially moved to another selected position to bodily shift said first gear and establish an operative driving connection between said gears.

10. In combination with an axially movable, rotatably mounted garment support, a garment trimming unit, and means for synchronously operating said support and trimming unit comprising driving mechanism connecting said support and trimming unit and including a power transmission member, and means for bodily shifting said member from an inoperative position to an operative position to establish the driving connection when the support is axially moved in one direction to a predetermined position.

11. Garment trimming apparatus including a rotatable garment support, rotatable cutting means, and means for synchronously operating said support and cutting means comprising a single power transmission train common to said support and cutting means.

12. In garment trimming apparatus, a rotary cutting member, means for positively feeding the garment material to said cutting member comprising opposed relatively movable feed elements between which the garment material is received, one of said elements being an endless flexible belt, means for bodily moving one of said elements into and out of co-operative relation with the other element, and actuating means for said cutting member and feed elements.

13. In garment trimming apparatus, a rotary cutting member, means for positively feeding the garment material to said cutting member comprising opposed relatively movable feed elements between which the garment material is received, means for bodily swinging one of said elements about a vertical axis into or out of co-operative relation with the other element, and actuating means for said cutting member and feed elements.

14. In garment trimming apparatus, a rotatable cutting member, means for positively feeding the garment material to said cutting member comprising a pair of opposed movable belts positioned to engage the inner and outer sides, respectively, of garment material received therebetween, and means for synchronously actuating said cutting member and belts.

15. In garment trimming apparatus, a rotatable cutting member, means for positively feeding the garment material to said cutting member comprising a pair of opposed movable belts positioned to engage the inner and outer sides, respectively, of garment material received therebetween, means for bodily moving one of said belts to and from an operative position relative to the other belt, and means for synchronously actuating said cutting member and belts.

16. In garment trimming apparatus, a pair of co-acting cutting members, and a movable feeding element associated with each cutting member to engage the inner and outer sides, respectively, of the garment material and positively feed the same between the cutting edges of said members.

17. In garment trimming apparatus, a pair of co-acting cutting members, means for rotating said members, movable belts having driving connection with the respective cutting members, arranged to engage the inner and outer sides, respectively, of the garment material and positively feed the same between the cutting edges of said members.

18. In garment trimming apparatus, a pair of co-acting cutting members, a movable feeding element associated with each cutting member to engage the inner and outer sides, respectively, of the garment material and positively feed the same between the cutting edges of said members, and means to bodily move one of said cutting members and the associated feeding element into and out of co-operative relation with the other cutting member and feeding element.

19. In garment trimming apparatus, a pair of co-acting cutting members, means for rotating said members, movable belts having driving connection with the respective cutting members, arranged to engage the inner and outer sides, respectively, of the garment material and positively feed the same between the cutting edges of said members, and means to bodily move one of said cutting members and the associated feeding belt into and out of co-operative relation with the other cutting member and feeding belt.

20. In garment trimming apparatus, a pair of co-acting cutting members, a movable feeding element associated with each cutting member to engage the inner and outer sides, respectively, of the garment material and positively feed the same between the cutting edges of said members, and means for bodily swinging one of said cutting members and the associated feeding element about a vertical axis, into or out of co-operative relation with the other cutting member and feeding element.

21. In garment trimming apparatus, a pair of co-acting rotary cutting members and drive means therefor, a pair of endless movable belts associated with each of said cutting members and arranged on opposite sides of the plane of rotation of said member, the belts in each pair engaging the garment material at vertically spaced points on the inner and outer sides thereof, respectively, to positively feed the same between the cutting edges of said members.

22. In garment trimming apparatus, a pair of co-acting rotary cutting members and drive means therefor, a pair of endless movable belts associated with each of said cutting members and arranged on opposite sides of the plane of rotation of said member, the belts in each pair engaging the garment material at vertically spaced points on the inner and outer sides thereof, respectively, to positively feed the same between the cutting edges of said members, and means drive connecting the cutting members with the respective pairs of feeding belts.

JACOB SCHLESINGER.